N. WILTON.
Lathe-Work Holder.

No. 69,883. Patented Oct. 15, 1867.

WITNESSES:

INVENTOR:
Nathaniel Wilton

United States Patent Office.

NATHANIEL WILTON, OF GROTON, NEW HAMPSHIRE.

Letters Patent No. 69,883, dated October 15, 1867.

---

IMPROVED JAWS FOR LATHE-DOGS AND BENCH-VISES.

---

The Schedule referred to in these Letters Patent and making part of the same.

---

TO ALL WHOM IT MAY CONCERN:

Be it known that I, NATHANIEL WILTON, of Groton, in the county of Grafton, and State of New Hampshire, have invented a new and useful Improvement in Jaws for Lathe-Dogs, Bench-Vises, etc.; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to improve the construction of the jaws of lathe-dogs, bench-vises, etc., so that they may be able to hold the work firmly, whether it be straight or tapering; and it consists in the combination of the semi-cylindrical self-adjusting pieces or jaws with the jaws of the dog or vise, as hereinafter more fully described.

Figure 1:
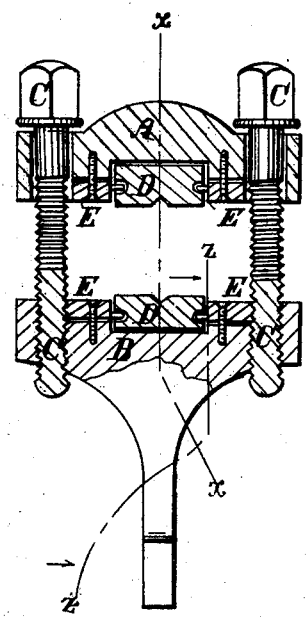
Figure 1 is a detail sectional view of a lathe-dog, illustrating my improvement taken through the line $y\,y$, fig 2.
Figure 2:
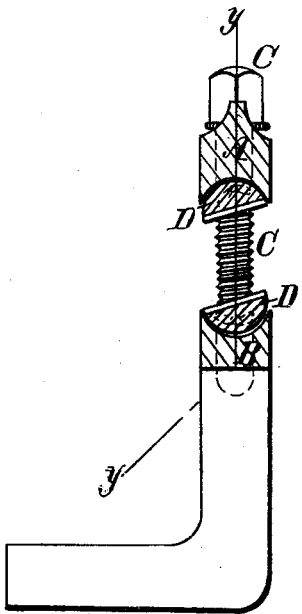
Figure 2 is a detail sectional view of the same, taken through the line $x\,x$, fig. 1.
Figure 3:
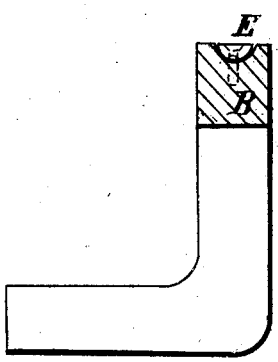
Figure 3 is a detail sectional view of the same, taken through the line $z\,z$, fig. 1.

A and B represent the jaws of a lathe-dog, which are drawn together to clamp the work by means of the screws C. In the central part of the faces of the jaws A and B are formed semi-cylindrical recesses, as shown in figs. 1 and 2, for the reception of the self-adjusting jaws D. The jaws D are made semi-cylindrical in form so as to fit into the recesses in the faces of the jaws A and B, and have curved or circular grooves formed in their ends for the reception of the guide or stop-pins, by which they are secured in place, and by which their movement is restricted. The said stop and guide-pins are formed upon or attached to small blocks E, fitting into and secured in recesses formed in the faces of the jaws A and B at the ends of the self-adjusting jaws D, as shown in figs. 1 and 3, so as to hold the said jaws securely in place while they are free to adjust themselves to the shape of the work to be held. By means of this improvement the work, whether it be straight or tapering, will be securely held, the jaws D adjusting themselves to it so as to bear upon it throughout their entire breadth.

I claim as new, and desire to secure by Letters Patent—

The combination in a lathe-dog of the semi-cylindrical self-adjusting pieces or jaws D with the jaws A and B and screws C, or their equivalents, substantially as herein shown and described and for the purpose set forth.

NATHANIEL WILTON.

Witnesses:
   J. C. HALL,
   GEO. E. COLBURN.